US009635414B2

(12) United States Patent
Thayer et al.

(10) Patent No.: US 9,635,414 B2
(45) Date of Patent: Apr. 25, 2017

(54) APPLICATION VIEWS

(71) Applicant: HEWLETT-PACKARD DEVELOPMENT COMPANY, L.P., Houston, TX (US)

(72) Inventors: Karen E Thayer, Fort Collins, CO (US); Jeffrey J Walls, Fort Collins, CO (US); Derek Lukasik, Fort Collins, CO (US); Mark E Nylund, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 13/629,074

(22) Filed: Sep. 27, 2012

(65) Prior Publication Data

US 2014/0089385 A1   Mar. 27, 2014

(51) Int. Cl.
*G06F 15/16* (2006.01)
*H04N 21/431* (2011.01)
*H04N 21/4402* (2011.01)
*H04N 21/414* (2011.01)

(52) U.S. Cl.
CPC ... *H04N 21/4314* (2013.01); *H04N 21/41415* (2013.01); *H04N 21/4402* (2013.01)

(58) Field of Classification Search
USPC .............. 709/203, 204, 217, 218, 219, 227; 345/2.1, 2.2, 2.3
See application file for complete search history.

(56) References Cited

U.S. PATENT DOCUMENTS

| 7,387,250 | B2 * | 6/2008 | Muni | G06Q 20/208 |
| | | | | 235/383 |
| 8,185,581 | B2 * | 5/2012 | Duggal | G06Q 10/10 |
| | | | | 709/202 |
| 2003/0088647 | A1 * | 5/2003 | ShamRao | G06F 17/30902 |
| | | | | 709/219 |

(Continued)

OTHER PUBLICATIONS

Kurkovsky, S. et. al, Integrating Diverse IT Areas: Bridging the Gap between Multimedia Kiosks and the Wireless World. Published in: Information Technology: Research and Education, 2004. ITRE 2004 $2^{nd}$ International Conference. Jun. 28-Jul. 1, 2004. pp. 34-38.*

(Continued)

*Primary Examiner* — Kevin Bates
*Assistant Examiner* — Ranjan Pant
(74) *Attorney, Agent, or Firm* — HP Inc. Patent Department

(57) ABSTRACT

In one embodiment, first data, indicative of a first selected application to be accessed via a remoting application, is received at a computer system from a first mobile device. Second data, indicative of a second selected application to be accessed via a remoting application, is received at the computer system from a second mobile device. A first view of the first selected application, as executing at the computer system, is displayed at a first display sector of a display device that is part of the computer system. A second view of the second selected application, as executing at the computer system, is displayed at a second display sector of the display device. At least a portion of the first view is sent to the first mobile device for display, and at least a portion of the second view is sent to the second mobile device for display.

20 Claims, 5 Drawing Sheets

(56) References Cited

U.S. PATENT DOCUMENTS

| | | | | |
|---|---|---|---|---|
| 2005/0021509 A1* | 1/2005 | Burns | .................... | G06Q 30/06 |
| | | | | 707/3 |
| 2009/0160735 A1* | 6/2009 | Mack | .................... | G06Q 30/02 |
| | | | | 345/2.3 |
| 2011/0041161 A1* | 2/2011 | Capati | .................... | A63F 13/77 |
| | | | | 726/4 |
| 2011/0208801 A1* | 8/2011 | Thorkelsson | ....... | H04L 67/2814 |
| | | | | 709/203 |
| 2014/0006451 A1* | 1/2014 | Mullis | .................... | G06F 17/30 |
| | | | | 707/784 |

OTHER PUBLICATIONS

"Interactive Kiosks," <http://www.canditv.com/Services/InteractiveKiosks; Data Driven Logistics Ltd>; 3 pages, 2010.

Chang, Ee-Chien, et al.; "Seamless & Secure Interactions via Untrusted Kiosk using Mobile Device's Camera"; NUS Enterprise; 2 pages.

Huang et al,. "Kimono: Kiosk-Mobile Phone Knowledge Sharing System," MIT, Research Papers, 2005; 10 pages.

* cited by examiner

| Screen Allocation Database ||
|---|---|
| Number of Accessing Mobile Devices | Size of Sector(s) |
| 1 | 100% Available Area*<br>*(Available Area = Total Display Area – Static Area - Shared Area) |
| 2 | 50% of Available Area |
| 3 | 33% of Available Area |
| 4 | 25% of Available Area |
| 5 | 20% of Available Area |

APPLICATION VIEWS

BACKGROUND

An informational computer kiosk is a computing device that allows users to get specific information via interaction with a user interface at the kiosk. Informational computer kiosks are typically designed to be self-service, and can display advertisements, coupons, menus, maps, or other informative data that might appeal to a user.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIG. 3 is an example of a screen allocation database, according to various embodiments.

The same part numbers designate the same or similar parts throughout the figures.

DETAILED DESCRIPTION OF EMBODIMENTS

Figure 1:
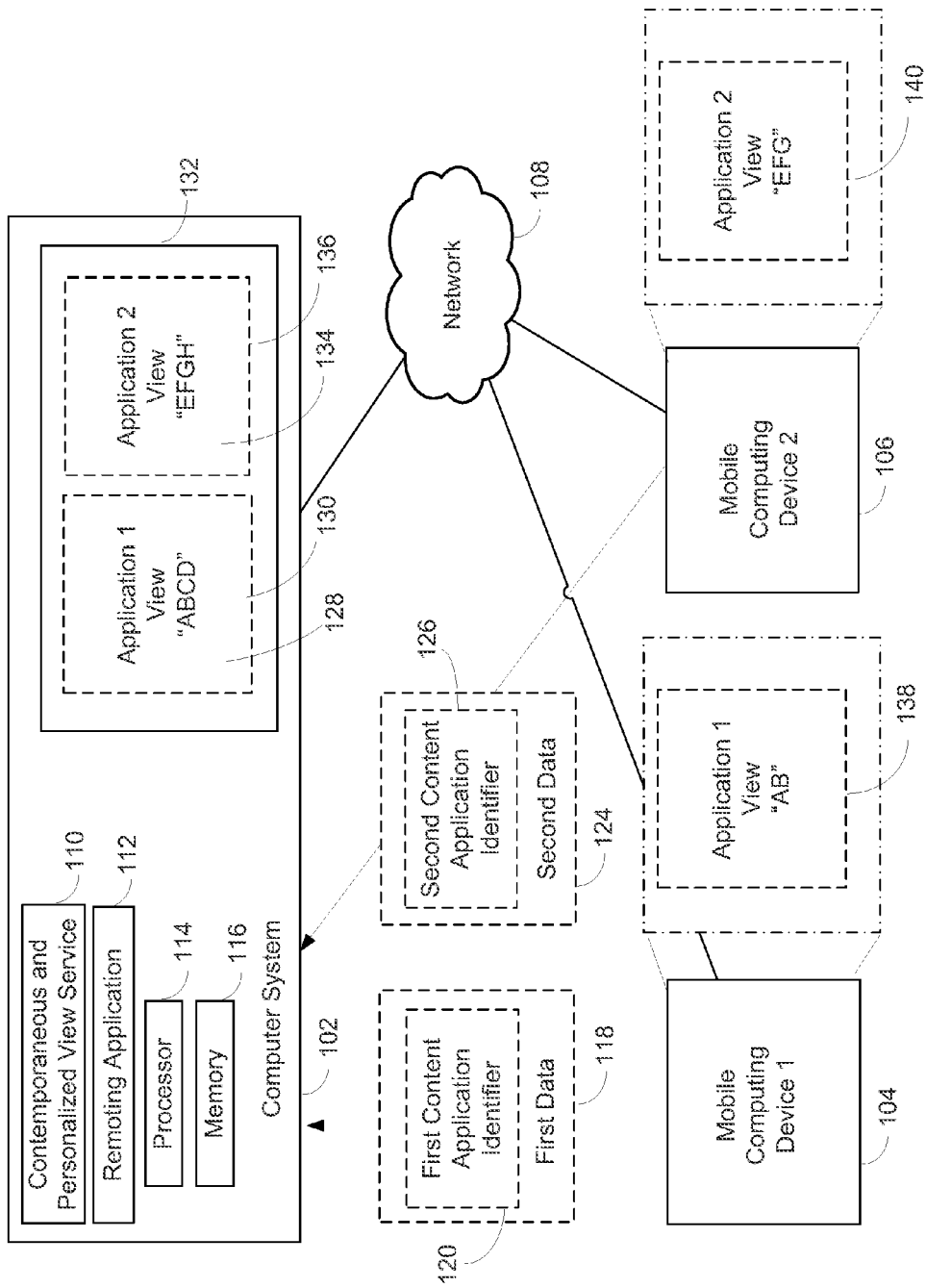
FIG. 1 is a block diagram illustrating a system according to various embodiments.

Informational kiosks can very helpful to consumers and other users, e.g., visitors to a shopping mall or entertainment park. However, the amount of usage of the kiosk and the user experience can be greatly affected by resource constraints. For example, in many environments informational kiosks will be infrequently provided due to the expense of the device, and as such the occasional kiosk may be difficult for users to find. Further, once a user finds a kiosk, there may be a waiting time if another customer is already interacting with the kiosk. In other situations, there may be a queue of customers waiting to utilize the kiosk. Difficulty in finding a kiosk and lack of immediate availability of a kiosk will frequently cause intended users to delay or cancel their intended interactions with the kiosk. These cancellations and delays can result in underutilization of the kiosks relative to their capabilities, and/or user dissatisfaction with the kiosk device and/or the shopping mall, entertainment park, or other entity that provides the kiosk.

Accordingly, various embodiments described herein were developed to provide a computer kiosk or other computer system to provide information to multiple customers at once via the consumer's mobile devices and via a screen-sharing protocol that considers the number of customers currently interacting with the system and/or in a queue to access the system. In certain examples of the disclosure, users will be able interact with the system, regardless of queue size, immediately upon sending of a message to the system or coming into wireless connectivity with the system. In certain examples of the disclosure, a customer can choose from a pre-defined list what type of information they would like to view. For example, one customer might want to view a map of the store and another customer might want to see what sales are currently being offered.

Advantages of the disclosure include that the disclosure makes practical the efficient sharing, from a kiosk or other computer system, of specific information about a particular store or service to several users concurrently, thereby increasing user satisfaction and reducing expenses for the entity providing the kiosk. As result of the fact that many people carry smart phones or other mobile computing devices, users can have up-to-date, relevant information contemporaneously displayed at the kiosk and at their mobile devices, despite the presence of a queue of persons waiting to utilize a kiosk's user interface component.

As used in this application, "mobile computing device" and "mobile device" are used synonymously, and refer to any portable computing device capable of communicating with another computing device. An "application" refers to a software application. A "remoting application" refers to a software application that enables a first computing device to view and/or interact with an application executing at a second computing device. In various examples, a remoting application can execute or run a shared application on a host computer, and can enable two or more users to access the application or electronic document from their respective computers simultaneously in real time. A "content application" refers to any software application from which content is shared with multiple computing devices via a remoting application. "Content" refers to text, images, and/or other subject matter or other information that can be received by a computer system for display or printing, and/or stored at the computer system in electronic form, e.g., for later display or printing. A "sector" of a display device refers to an area or a portion of the display device that is distinct or separate from other areas or portions. In examples, sectors may differentiated by a border, a pane, a distinctive fonts, distinctive colors, or any other feature or display formatting that makes one portion of a display device distinctive from another. "Display formatting" refers to attributes of an electronic document or view that affect how such document or view display is electronically displayed. Examples of variables that may be affected in during display formatting include font size, color, image resolution, and crop or border placement.

FIG. 1 shows a computer system 102 electronically connected to a first mobile computing device 104 and a second mobile computing device 106 via a network 108. Computer system 102 represents generally any computing device or group of computing devices configured to send and receive network requests, send and receive data, and/or otherwise communicate with, the first 104 and second 106 mobile computing devices. In examples, the computer system 102 may be or include a server, desktop computer, notebook computer, mobile device, tablet computer, and/or any other computing device.

Mobile computing devices 104 and 106 each represent generally any mobile computing device configured to send and receive network requests, send instruction data and other data to, receive content data and other data from, and otherwise communicate with, the computer system 102. In examples, the first 104 and/or the second 106 mobile computing devices may be a smartphone, tablet computer, notebook computer, or any other mobile computing device.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between the computer system 102, the first mobile computing device 104, and the second mobile computing device 106 as depicted in FIG. 1 represent the logical communication paths between these devices, not necessarily the physical paths between the devices.

Computer system 102 is shown to include a contemporaneous and personalized view service ("CPVS") 110, a remoting application 112, a processor 114, and a memory 116. CPVS 110 represents generally any combination of hardware and programming configured to provide for contemporaneous displaying of a personalized application views at a computer system and at mobile computing devices in electronic communication with the system. Remoting application 112 represents generally any combination of hardware and programming that enables the sharing of a content application that is executing at computer system 102 with other computing devices, e.g., the first and second mobile computing devices 104 106 depicted at FIG. 1. The remoting application 112 is to enable users at the first and second computing devices 104 106 to view and/or interact with a content application executing at the computing device 102. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

In the example of FIG. 1, the CPVS 110 executing at computer system 102 causes the system 102 to receive, from the first mobile computing device 104, first data 118 indicative 120 of a first selected content application to be accessed via the remoting application 112. In this example, the first selected content application is an application that has been selected by a user at the first mobile computing device 104 for viewing at the computer system 102 and at the first mobile computing device 104. The CPVS 110 also causes the system 102 to receive, from the second mobile computing device 106, second data 124 indicative 126 of a second selected content application to be accessed via the remoting application 112. In this example, the second selected content application is an application selected by a second user at the second mobile computing device 106 for viewing at the computer system 102 and at the second mobile computing device 106.

Following receipt of the first data 118 and the first data 124 at the computer system 102, the computer system 102 displays or causes a display of a first view 128 of the first selected content application, as executing at the computer system 102. In this example the first view includes the text "ABCD." The display of the first view 128 occurs at a first sector 130 of a display device 132 that is part of the computer system 102. Contemporaneous with the display of the first view 128, the computer system 102 displays or causes a display of a second view 134 of the second selected content application, as executing at the computer system 102. In this example the second view 134 includes the text "EFGH." The display of the second view 134 occurs at a second sector 136 of the display device 132.

Contemporaneous with the displays of the "ABCD" first view 128 and the "EFGH" second view 134 at the display device 132, the computer system 102 sends to the first mobile computing device 104, for display, at least a portion 138 of the first view 128, and sends to the second mobile computing device 106, for display, at least a portion 140 of the second view 134. In this example, the "AB" portion 138 of the "ABCD" first view 128 is displayed at the first mobile computing device 104, and the "EFG" portion 140 of the "EFGH" second view 134 is displayed at the second mobile computing device 106.

In an example, the at least a portion of the first view 128 (the "AB" portion 138) is sent to the first mobile computing device 104 with display formatting specific for the first mobile computing device 104, and the at least a portion of the second view 134 (the "EFG" portion 140) is sent to the second mobile computing device 106 with display formatting specific for the second mobile computing device 106. In another example, the "AB" portion 138 is sent to the first mobile computing device 104 with display formatting specific for a display size of the first mobile computing device 104, and the "EFG" portion 140 is sent to the second mobile computing device 106 with display formatting specific for a display size of the second mobile computing device 106.

In another example, the computer system 102 may send the entire first view "ABCD" to the first mobile computing device 104, and/or may send the entire second view "EFGH" to the second mobile computing device 106, for display. This may be advantageous in situations where the first or second views are of a size (height, width, font size, etc.) such that the views at the computer system 102 are also readable at the mobile devices without redacting or alteration.

The functions and operations described with respect to CPVS 110 and computer system 102 may be implemented as a non-transitory computer-readable storage medium containing instructions executed by a processor (e.g., processor 114) and stored in a memory (e.g., memory 116). In a given implementation, processor 114 may represent multiple processors, and memory 116 may represent multiple memories. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

Figure 2:
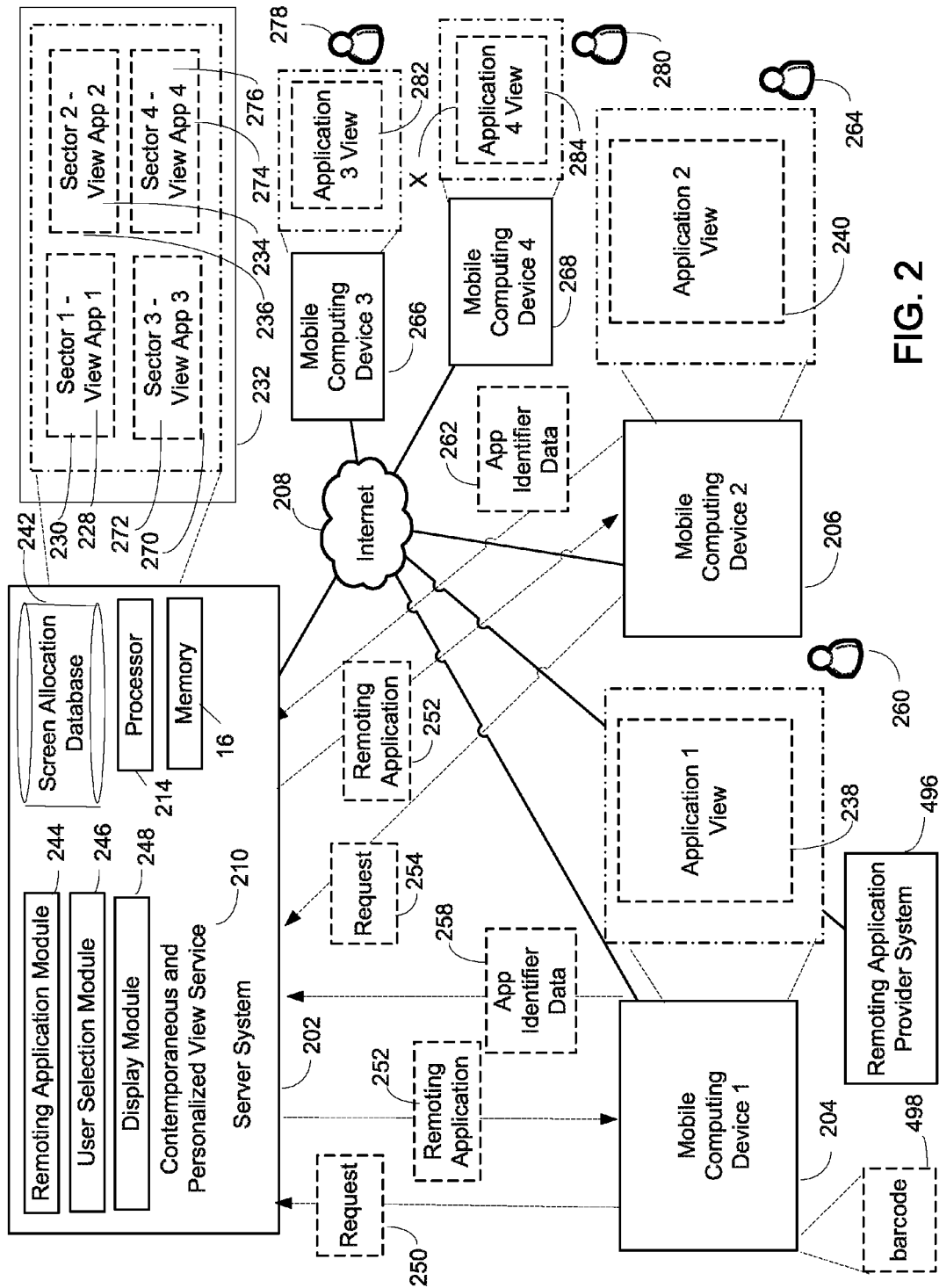
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202 electronically connected to a first mobile computing device 204, a second mobile computing device 206, a third mobile computing device 266, and a fourth mobile computing device 268 via an internet 208. Server system 202 represents generally any computing device or group of computing devices configured to send and receive network requests, send and receive data, and/or otherwise communicate with, the first, second, third, and fourth mobile computing devices. In examples, the server system 202 may be or include a server, desktop computer, notebook computer, mobile device, tablet computer, and/or any other computing device.

Mobile computing devices 204 206 266 268 each represent generally any mobile computing device configured to send and receive network requests, send instruction data and other data to, receive content data and other date from, and otherwise communicate with, the server system 202. In examples, the first, second, third, or fourth mobile computing devices 204 206 266 268 may be a smartphone, tablet computer, notebook computer, or any other mobile computing device.

Internet 208 represents generally hardware components and computers interconnected by communications channels that allow sharing of resources and information over an internet or intranet network, or over a combination of both. Internet 208 may include a cable, wireless, fiber optic, or remote connection via a telecommunication link, an infrared link, a radio frequency link, or some combination of these, or any other connectors or systems that provide electronic communication. Internet 208 may also include intermediate proxies, routers, switches, load balancers, and the like. The paths followed by internet 208 between the server system 202, the first mobile computing device 204, and the second mobile computing device 206 as depicted in FIG. 2 represent the logical communication paths between these devices, not necessarily the physical paths between the devices.

Server system 202 is shown to include a contemporaneous and personalized view service ("CPVS") 210, a screen allocation database 242, a processor 214, and a memory 216. CPVS 210 represents generally any combination of hardware and programming configured to provide for contemporaneous displaying of a personalized application views at a computer system and at mobile computing devices in electronic communication with the system. The CPVS 210 includes a remoting application module 244, a user selection module 246, and a display module 248. Screen allocation database 242 represents generally a database, registry, lookup table or list that associates size of new or existing display sectors for a display device according to use variables, such as the size of other display sectors being displayed, a total display area of the display device, or an available area of the display device. Processor 214 represents generally any instruction execution system, such as a computer/processor based system or an ASIC (Application Specific Integrated Circuit), a computer, or other system that can fetch or obtain instructions or logic stored in memory 216 and execute the instructions or logic contained therein. Memory 216 represents generally any memory configured to store program instructions and other data.

In the example of FIG. 2, the remoting application module 244 included within the CPVS 210 and executing at server system 202, responsive to receipt of an electronic request 250 from the first mobile computing device 204, sends to the first mobile computing device 204 a remoting application 252. The remoting application 252 is to enable the first mobile computing device 204 to act as a receiver for the views of applications executing at the server system 202, the views sent by the server system 202. In one example, the request 250 received at server system 202 from the first mobile computing device 204 is an explicit or direct request for the server system 202 to send the remoting application 254. In another example, the request 250 received at server system 202 from the first mobile computing device 204 is a request for a particular content, e.g., content being served or displayed as the result of an application executing at the server system 202, or a request to access a content application.

In this example, the remoting application module 244 additionally, responsive to receipt of an electronic request 254 from the second mobile computing device 206, sends to the second mobile computing device 206 a remoting application 252. In an example, the remoting application 252 is a separate or another copy or instance of the remoting application 250 that was sent to the first mobile computing device, and is to enable the second mobile computing device 206 to act as a receiver for views of applications executing at the server system 202. In another example, the remoting application 252 sent to the second mobile computing device 206 can be a different application, e.g., if the first 204 and second 206 mobile computing devices are different models or are from different manufacturers and require different remoting applications.

In other examples, the server system 202 may not send the remoting application to the first or second mobile computing devices 206 208. In an example, remoting applications utilized at the first and second mobile computing devices 204 206 may be remoting applications sent by an alternative remoting application provider system 496, distinct from the server system 202, to the first and/or second mobile computing devices 204 206 over the internet 208. In an example, the first and/or second mobile computing devices 206 208 may be directed to the remoting application provider system 496 via scanning of a QR code or other barcode 498 at a mobile computing device 204 206.

Continuing with the example of FIG. 2, after installation of the remoting application 252 at the first mobile computing device 204, the user selection module 246 receives from the first mobile computing device 204, via the remoting application 252, first application identifier data 258. The application identifier data 258 is indicative of a first selected content application that a first user 260 at the first mobile computing device 204 desires to access via the remoting application 252. In an example, the first selected content application may be an application to recommend and introduce recreational activities near a display device 232 that is part of the server system 202. Likewise, in this example after installation of the remoting application 252 at the second mobile computing device 206, the user selection module 246 receives from the second mobile computing device 206, via the remoting application 252 application, second identifier data 262. The second application identifier data 262 is indicative of a second selected content application that a second user 264 at the second mobile computing device 206 desires to access via the remoting application 252. In an example, the second selected content application may be an application to recommend and introduce lodging and dining options at the display device 232. In an example, the first and second mobile computing devices 204 and 206 may send application identifier data 258 262 to the server system 202 that identities a same selected content application.

In an example, the receipt of the application identifier data at the server system 202 from the first or second mobile computing device 204 206 may be via text messaging, NFC, wireless, Bluetooth or other communication technology (in some circumstances even after installation of the remoting technologies) because of efficiency of such alternative communication means for this communication. In another example, the receipt of the application identifier data 258 or 262 may precede the installation of the remoting applications 252 at such mobile devices, and be via a text messaging, NFC, wireless, Bluetooth or other communication technology.

Following receipt of the first application identifier data 258 at the server system 202, the server system 202 displays or causes a display of a first view 228 of the first selected content application, as executing at the server system 202. The display of the first view 228 occurs at a first sector 239 of a display device 232 that is part of the server system 202. Contemporaneous with the display of the first view 228, the server system 202 displays or causes a display of a second view 234 of the second selected content application, as executing at the server system 202. The display of the second view 234 occurs at a second sector 236 of the display device 232.

The server system 202 in this example additionally displays or causes a display, at a third sector 270 of the display device 232, of a third view 272 of a third content application as executing at the server system 202. The third content application is a software application that a user 278 at the third mobile computing device 266 has requested to view at the server system's 202 display device 232. In an example, the third content application may be an application to enable the playing of games relating to historical landmarks or other attractions located in proximity of the display device 232. The server system 202 displays or causes a display, at a fourth sector 274 of the display device 232, of a fourth view 276 of a content application as executing at the server system 202. The fourth content application is a software application that a user 280 at the fourth mobile computing device 268 has requested to view at the display device 232. For instance, the fourth content application may be an application to enable users to "sign" an electronic guestbook provided at the display device 232.

Contemporaneous with the displays of the first view 228, second view 234, third view 272, and fourth view 276 at the server system's 202 display device 232, the server system 202 sends to the first mobile computing device 204, for display, at least a portion 238 of the first view 228, sends to the second mobile computing device 206, for display, at least a portion 240 of the second view 234, sends to the third mobile computing device 266, for display, at least a portion 282 of the third view 272, and sends to the fourth mobile computing device 268, for display, at least a portion 284 of the fourth view 276. The server system 202 sends the views to the first and second mobile computing devices 204 206 via remoting applications 252, or via other remoting applications.

In examples, the size, formatting, or other attributes of the first, second, third, and fourth display sectors 230 236 270 274 as displayed on the server system's 202 display device may be determined in consideration of the number of mobile computing devices accessing content applications at the server system 202 and/or a total display area of the display device 232. In an example, the server system 202 accesses the screen allocation database 242 in determining the first 230 and second 236 display sectors relative to other display sectors and/or an available area of the display device 232.

FIG. 3 provides an example of a screen allocation database 242, which may include a database, registry, lookup table or list that associating size of new or existing display sectors for a display device 232 according to use variables, such as the size of other display sectors being displayed, or total or available display area of the display device In the example of FIG. 3, the screen allocation database 242 establishes a size of display device 232 sectors in consideration of the number of mobile devices then accessing the server system 202. In the example of FIG. 3, a server system's display device has an "available area" that is the "total area" of the display device, less "static area" and less "shared area" of the display device. In other examples different formulas and algorithms may be utilized in determining display sectors or attributes of display sectors.

The functions and operations described with respect to CPVS 210 and server system 202 may be implemented as a non-transitory computer-readable storage medium containing instructions executed by a processor (e.g., processor 214) and stored in a memory (e.g., memory 216). In a given implementation, processor 214 may represent multiple processors, and memory 216 may represent multiple memories. Processor 214 represents generally any instruction execution system, such as a computer/processor based system or an ASIC (Application Specific Integrated Circuit), a computer, or other system that can fetch or obtain instructions or logic stored in memory 216 and execute the instructions or logic contained therein. Memory 216 represents generally any memory configured to store program instructions and other data.

Figure 4:
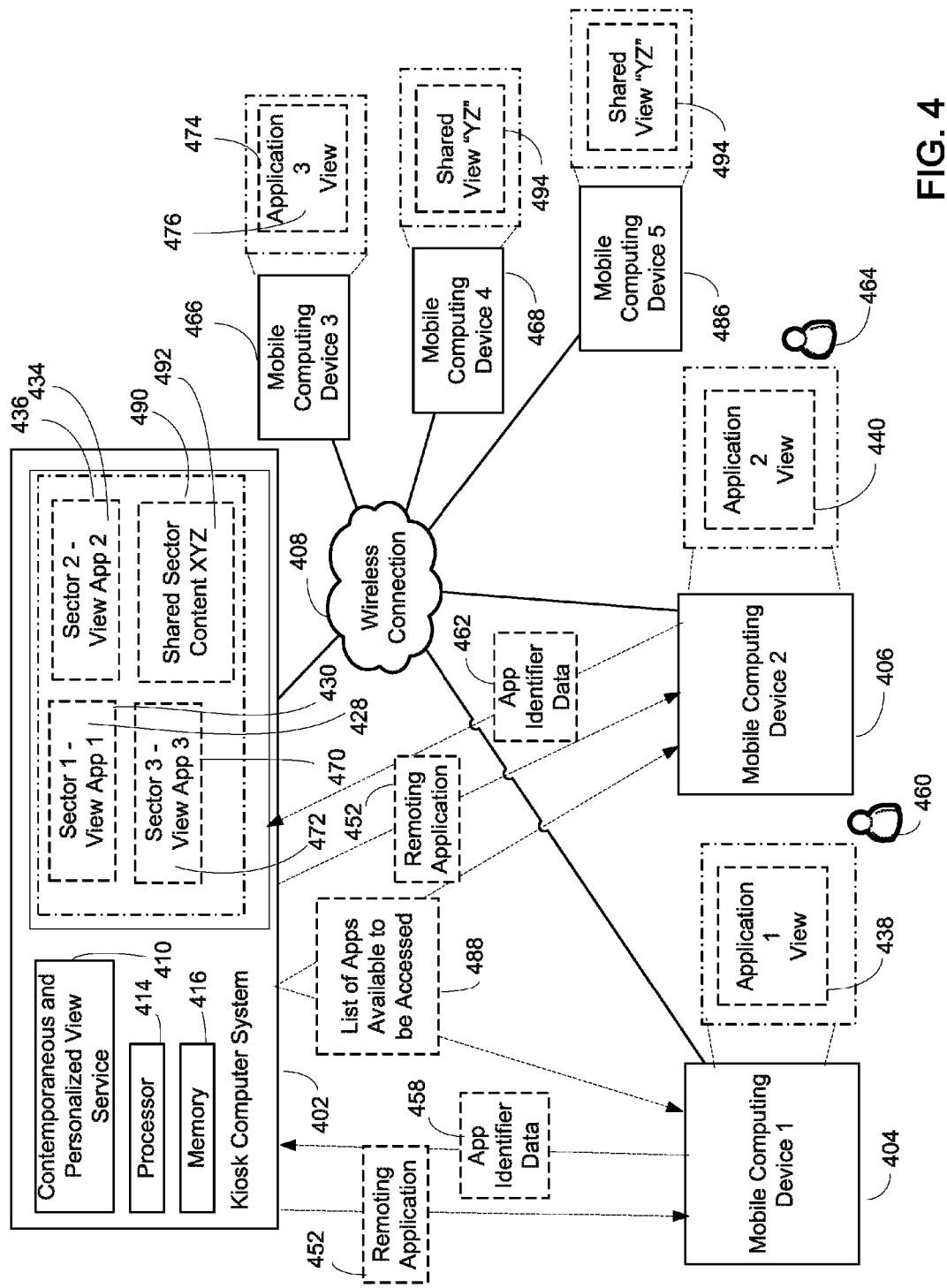
FIG. 4 is a block diagram illustrating a system according to various embodiments.

FIG. 4 is a block diagram illustrating a system according to various embodiments. FIG. 4 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 4 shows a kiosk computer system 402 electronically connected to a first mobile computing device 404, a second mobile computing device 406, a third mobile computing device 466, a fourth mobile computing device 468, and a fifth mobile computing device 486, via a Wi-Fi or other wireless connection 408. Kiosk computer system 402 represents generally any computing device or group of computing devices configured to send and receive network requests, send and receive data, and/or otherwise communicate with, the first 404, second 406, third 466, fourth 468, and fifth 486 mobile computing devices.

Mobile computing devices 404 406 466 468 486 each represent generally any mobile computing device configured to send and receive network requests, send instruction data and other data to, receive content data and other date from, and otherwise communicate with, the kiosk computer system 402. In examples, the mobile computing devices may be a smartphone, tablet computer, notebook computer, or any other mobile computing device.

Wireless connection 408 represents generally hardware components and computers interconnected by communications channels that allow sharing of resources and information over an internet or intranet network, or over a combination of both. Wireless connection 408 may include a connection via a telecommunication link, an infrared link, a radio frequency link, or some combination of these, or any other connectors or systems that provide wireless electronic communication. Wireless connection 408 may also include intermediate proxies, routers, switches, load balancers, and the like. The paths followed by wireless connection 408 between the kiosk computer system 402, the first mobile computing device 404, and the second mobile computing device 406 as depicted in FIG. 4 represent the logical communication paths between these devices, not necessarily the physical paths between the devices.

Kiosk computer system 402 is shown to include a contemporaneous and personalized view service ("CPVS") 410, a processor 414, and a memory 416. CPVS 410 represents generally any combination of hardware and programming configured to provide for contemporaneous displaying of a personalized application views at a kiosk computer system and at mobile computing devices in electronic communication with the system. Processor 414 represents generally any instruction execution system, such as a computer/processor based system or an ASIC (Application Specific Integrated Circuit), a computer, or other system that can fetch or obtain instructions or logic stored in memory 416 and execute the instructions or logic contained therein. Memory 416 represents generally any memory configured to store program instructions and other data.

In the example of FIG. 4, the CPVS 410 executing at kiosk computer system 402, responsive to initiation or detection of a wireless communication between the kiosk computer system and the first mobile computing device, sends to the first mobile computing device 404 a remoting application 452. The remoting application 452 is to enable the first mobile computing device 404 to act as a receiver for the views of applications executing at the kiosk computer system 402 sent by the kiosk computer system 402. In this example, the CPVS 410 additionally, responsive to initiation or detection of a wireless communication between the kiosk computer system and the second mobile computing device, sends to the second mobile computing device 406 a remoting application 452.

Continuing with the example of FIG. 4, after installation of the remoting applications 452 at the first mobile computing device 404 and the second mobile computing device 406, the kiosk computer system 402 sends to the first and second mobile computing device a listing or listings 488 of applications or content available for access by the mobile computing devices via the remoting applications 452. In this example, the list or listings 488 are sent to the first and second mobile computing devices 404 406 via the remoting applications 452. In other examples, listings may be sent to the mobile computing devices via other means, e.g., via text messaging, NFC, wireless, Bluetooth or other communication technology, if such alternative sending means is desirable.

After sending of the list or lists of applications available to be accessed via the remoting applications 452 to the first and second mobile computing devices, the CPVS 410 receives from the first mobile computing device 404, via the remoting application 452, first application identifier data 458. The application identifier data 458 is indicative of a first selected content application that a first user 460 at the first mobile computing device 404 desires to access via the remoting application 452. Likewise, in this example after installation of the remoting application 452 at the second mobile computing device 406, the CPVS 410 receives from the second mobile computing device 406, via the remoting application 452 application, second identifier data 462. The second application identifier data 462 is indicative of a second selected content application that a second user 464 at the second mobile computing device 406 desires to access via the remoting application 452.

Following receipt of the first application identifier data 458 at the kiosk computer system 402, the kiosk computer system 402 displays or causes a display of a first view 428 of the first selected content application, as executing at the kiosk computer system 402. The display of the first view 428 occurs at a first sector 430 of a display device 432 that is part of the kiosk computer system 402. Following receipt of the second application identifier data 462 at the kiosk computer system 402, and contemporaneous with the display of the first view 428, the kiosk computer system 402 displays or causes a display of a second view 434 of the second selected content application, as executing at the kiosk computer system 402. The display of the second view 434 occurs at a second sector 436 of the display device 432. The kiosk computer system 402 additionally displays or causes a display, at a third sector 470 of the display device 432, of a third view 472 of a third content application as executing at the kiosk computer system 402. The third content application is a software application that a user 478 at the third mobile computing device 466 has requested to view at the computer kiosk's 402 display device 432.

Contemporaneous with the displays of the first view 428, second view 434, and third view 472 at the server system's 402 display device 432, the server system 402 sends to the first mobile computing device 404, for display, at least a portion 438 of the first view 428, sends to the second mobile computing device 406, for display, at least a portion 440 of the second view 434, and sends to the third mobile computing device 466, for display, at least a portion 474 of the third view 472. The server system 402 sends the views to the first and second mobile computing devices 404 406 via remoting applications 452, or via other remoting applications.

Contemporaneous with the display of the first 428, second 434, and third 472 views at the display device 432, the kiosk computer system 402 additionally displays at a shared sector 490 a shared view 492. In an example, the shared view 492 is a view of default content that is displayed to engage users at the display device that are not able to initiate an application sharing between the kiosk computing device 402 and their mobile device. In an example, such sharing may not be possible because the kiosk computing device 402 is configured to provide a maximum of x sectors for personalized or application-specific sharing, and all x sectors are currently being utilized.

For the example of FIG. 4, it can be assumed that a maximum of three personalized or application-specific sectors 428 436 470 can be made available at the display device 432 by the kiosk computer system 402. It can be further assumed that, in the snapshot of FIG. 4, these three available sectors personalized or application-specific sectors 428 436 470 are being fully utilized by the first, second, and third mobile computing devices 404 406 466. It can be further assumed that fourth 468 and fifth mobile computing devices 486 have attempted to send application identifier data to the kiosk computer system 402. so as to cause a view personalized content to be displayed at one of sectors one, two, or three 428 436 470 of the display device 432, and to cause at least a portion of the such views to be sent to the fourth and fifth mobile computing devices 468 486 for display.

In an example, as the fourth 468 and fifth 486 mobile computing devices are waiting, or queued, to engage in a personalized or application-specific sharing session at sector one 428, sector two 436, or sector three 470, the kiosk computer system 402 sends a shared view 494 of at least a portion of the default content 492 to the fourth and fifth mobile computing devices. The shared view 494 is sent contemporaneous with the display of the default content 492 at the display device 432. When sector one 428, two 436, or three 470 becomes available, e.g. when the first 404, second 406, or third 466 mobile computing device suspends or terminates a sharing session with the kiosk computer system 402, the kiosk computer system 402 will cease sending the shared view 494 to the first mobile computing device in the queue. The kiosk computer system 402 will then instead send to the first mobile device in the queue a personalized application view, in accordance with a request previously received at the kiosk computer system 402 from mobile computing device.

In examples, various shared sector rules can be put into effect to define or govern the shared sector 490 of the display device 432 and the providing of shared view 494 to mobile computing devices. In an example, the shared sector 490 displays default content that is not personalized to any particular mobile computing device, and the kiosk computer system 402 sends to new mobile devices (those mobile devices making initial session contacts with the kiosk computer system 402) a default view 492 when all available personalization sectors are being utilized. In an example, a rule may prescribe a FIFO transfer of a mobile computing device to personalization sector of the display device 432 (sectors one, two or three 428 436 470 in this example) when the personalization sector becomes available. In an example, the shared sector 490 at the display device 432 may be a sector that is presented at the display device 232 at all times, regardless of the number of mobile computing devices accessing the kiosk computer system 402. In an example, the shared content 492 is displayed at the shared sector 490 even if the number of mobile computing devices accessing the kiosk computer system 402 is zero).

The functions and operations described with respect to CPVS 410 and kiosk computer system 402 may be implemented as a non-transitory computer-readable storage medium containing instructions executed by a processor (e.g., processor 414) and stored in a memory (e.g., memory 416). In a given implementation, processor 414 may represent multiple processors, and memory 416 may represent multiple memories. Processor 414 represents generally any instruction execution system, such as a computer/processor based system or an ASIC (Application Specific Integrated Circuit), a computer, or other system that can fetch or obtain instructions or logic stored in memory 416 and execute the instructions or logic contained therein. Memory 416 represents generally any memory configured to store program instructions and other data.

Figure 5:
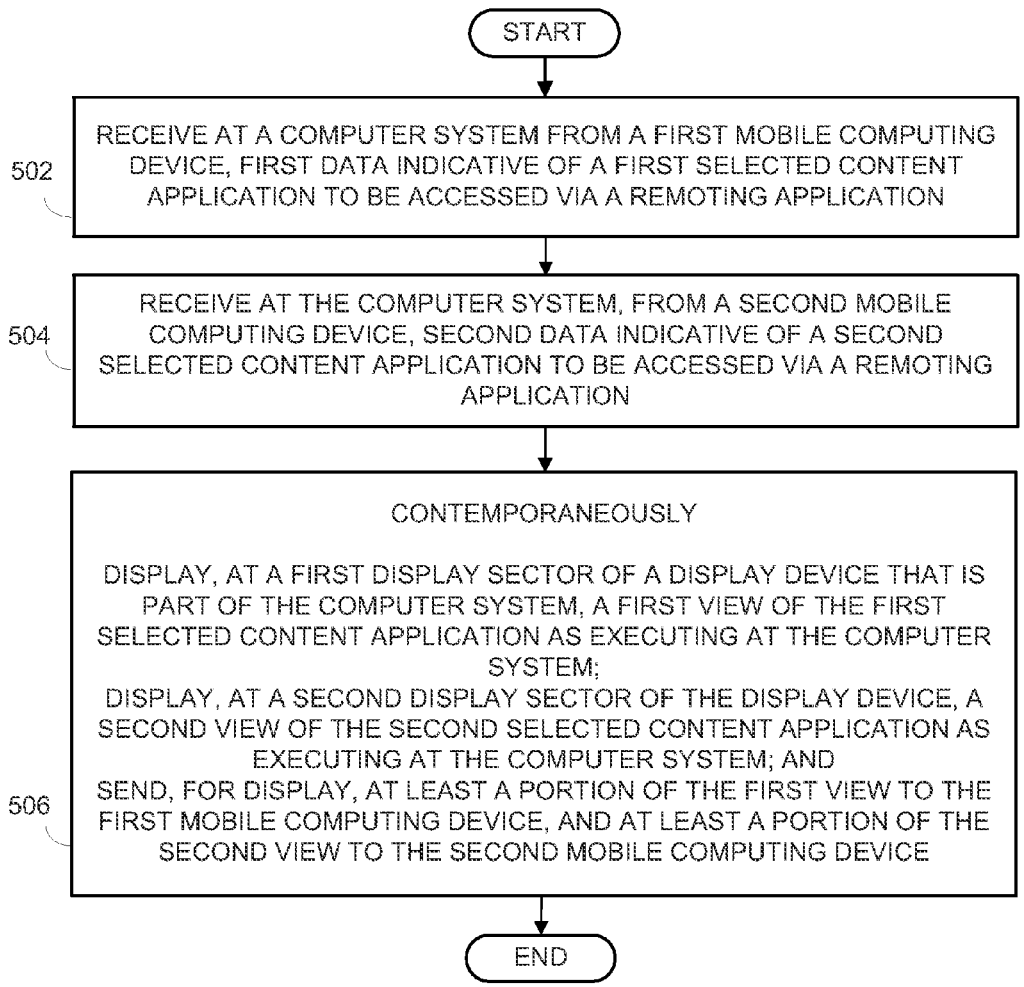
FIG. 5 is a flow diagram depicting steps taken to implement various embodiments.

FIG. 5 is a flow diagram of operation in a system according to various embodiments. In discussing FIG. 5, reference may be made to the diagram of FIG. 2 to provide contextual examples. Implementation, however, is not limited to those examples. Starting with FIG. 5, first data is received at a computer system from a first mobile computing device. The first data is, indicative of a first selected content application to be accessed via a remoting application (block 502). Referring back to FIG. 2, the remoting application module 244 may be responsible for implementing block 502.

Continuing with FIG. 5, second data is received at the computer system from a second mobile computing device. The second data is indicative of a second selected content application to be accessed via a remoting application (block 504). Referring back to FIG. 2, the user selection module 246 may be responsible for implementing block 504.

Continuing with FIG. 5, a first view of the first selected content application as executing at the computer system is displayed. The display occurs at a first display sector of a display device that is part of the computer system. Contemporaneous with the display of the first selected content, display, a second view of the second selected content application as executing at the computer system is displayed. The display occurs at a second display sector of the display device. Contemporaneous with the display of the first and second selected content, at least a portion of the first view is sent to the first mobile computing device for display, and at least a portion of the second view is sent to the second mobile computing device for display (block 506). Referring back to FIG. 2, the display module 248 may be responsible for implementing block 506.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium comprising instructions, the instructions when executed by a processor causing the processor to:
   receive at a kiosk computer system, from a first mobile computing device, first data indicative of a first selected content application associated with the first mobile computing device, the first selected content application to be accessed via a remoting application;
   receive at the kiosk computer system, from a second mobile computing device, second data indicative of a second selected content application associated with the second mobile computing device, the second selected content application to be accessed via the remoting application;
   contemporaneously:
      display, at a first display sector of a display device that is part of the kiosk computer system, a first view of the first selected content application associated with the first mobile computing device as executing at the kiosk computer system;
      display, at a second display sector of the display device, a second view of the second selected content application associated with the second mobile computing device as executing at the kiosk computer system; and
      send, for display, at least a portion of the first view to the first mobile computing device, and at least a portion of the second view to the second mobile computing device.

2. The medium of claim 1, wherein the first and second display sectors are determined based on a count of mobile computing devices accessing content applications at the kiosk computer system.

3. The medium of claim 1, wherein the kiosk computer system accesses a screen allocation database in determining the size of the first and second display sectors.

4. The medium of claim 1, wherein the kiosk computer system accesses a screen allocation database in determining the size of the first and second display sectors relative to other display sectors or to a total display area of the display device.

5. The medium of claim 1, wherein a remoting application is sent by the kiosk computer system to the first mobile computing device responsive to a request for the remoting application received from the first mobile computing device.

6. The medium of claim 1, wherein a remoting application is sent by the kiosk computer system to the first mobile computing device responsive to a request for content, or a request to access a content application, received from the first mobile computing device.

7. The medium of claim 1, wherein a remoting application is sent by the kiosk computer system to the first mobile computing device responsive to the initiation of wireless communication between the kiosk computer system and the first mobile computing device.

8. The medium of claim 1, wherein the display device includes a shared sector to display a default content, and wherein contemporaneous with the display of the default content, the kiosk computer system sends a view of at least a portion of the default content to a third mobile computing device waiting to access requested content.

9. The medium of claim 1, wherein
the kiosk computer system is a first computer system;
the remoting application is sent by a second computer system to the first mobile computing device over the internet, and
the first mobile computing device is directed to the second system via scanning of a barcode at the first mobile computing device.

10. The medium of claim 1, wherein the first and second data are received via remoting applications.

11. The medium of claim 1, wherein the first data is received after installation of a remoting application at the first mobile computing device, and the second data is received after installation of a remoting application at the second mobile computing device.

12. The medium of claim 1, wherein the entire first view is sent to the first mobile computing device.

13. The medium of claim 1, wherein the at least a portion of the first view is sent with display formatting specific for first mobile computing device.

14. The medium of claim 1, wherein the at least a portion of the first view is sent with display formatting specific for a display size of the first mobile computing device.

15. The medium of claim 1, wherein the instructions cause the processor to cause the kiosk computer system to send to the first mobile computing device a listing of applications or content available for access by the first mobile computing device via the remoting application.

16. The medium of claim 15, wherein the listing is sent via the remoting application.

17. An informational kiosk, comprising:
a display device;
a memory; and
a processor to execute instructions stored in the memory to:
send remoting applications to first and second mobile computing devices;
receive, from the first mobile computing device, first selection data indicative of a first selected content application associated with the first mobile computing device, the first selected content application to be accessed via a first remoting application;
receive, from the second mobile computing device, second selection data indicative of a second selected content application associated with the second mobile computing device, the second selected content application to be accessed via a second remoting application;
contemporaneously:
display, in a first sector of the display device, a view of the first selected content application associated with the first mobile computing device as executing at the informational kiosk;
display, in a second sector of the display device, a view of the second selected content application associated with the second mobile computing device as executing at the informational kiosk; and
send, for display, at least a portion of a view of the first selected content application to the first mobile computing device, and at least a portion of a view of the second selected content application to the second mobile computing device.

18. The system of claim 17, wherein the first and second sectors are determined in consideration of a number of mobile devices accessing content applications at the informational kiosk.

19. The system of claim 17, wherein the informational kiosk accesses a screen allocation lookup table in determining the size of the first and second sectors.

20. A non-transitory computer-readable storage medium comprising instructions, the instructions when executed by a processor causing the processor to:
responsive to initiation of wireless communication between a kiosk computer system and a first mobile device, and between the kiosk computer system and a second mobile device, send a remoting application from the kiosk computer system to the first and second mobile devices;
receive, from the first mobile computing device via a remoting application, data indicative of a first selected content application associated with the first mobile computing device, the first selected content application to be accessed via the remoting application;
receive from the second mobile computing device data indicative of a second selected content application associated with the second mobile computing device, the second selected content application to be accessed via the remoting application; and
contemporaneously:
display, at a first display sector of a display device that is part of the kiosk computer system, a first view of the first selected content application associated with the first mobile computing device as executing at the kiosk computer system;
display, at a second display sector of the display device, a second view of the second selected content application associated with the second mobile computing device as executing at the kiosk computer system, wherein sizes of the first and second sectors relative to other display sectors are determined using a screen allocation lookup table; and
send, for display, at least a portion of the first view to the first mobile computing device, and at least a portion of the second view to the second mobile computing device.

* * * * *

UNITED STATES PATENT AND TRADEMARK OFFICE
CERTIFICATE OF CORRECTION

PATENT NO. : 9,635,414 B2
APPLICATION NO. : 13/629074
DATED : April 25, 2017
INVENTOR(S) : Karen Ellen Thayer et al.

Page 1 of 1

It is certified that error appears in the above-identified patent and that said Letters Patent is hereby corrected as shown below:

On the Title Page

In item (72), Inventor, in Column 1, Line 1, delete "Karen E Thayer" and insert
-- Karen Ellen Thayer --, therefor.

In item (72), Inventor, in Column 1, Line 2, delete "Jeffrey J Walls" and insert
-- Jeffrey Joel Walls --, therefor.

In item (72), Inventor, in Column 1, Line 4, delete "Mark E Nylund" and insert
-- Mark Edward Nylund --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*